N. POGOLSKI.
AEROPLANE.
APPLICATION FILED JULY 11, 1910.

1,266,151. Patented May 14, 1918.
7 SHEETS—SHEET 1.

Fig. 1.

Witnesses
Inventor
Nicolas Pogolski.
By
Attorney

Fig. 18.

UNITED STATES PATENT OFFICE.

NICOLAS POGOLSKI, OF WASHINGTON, DISTRICT OF COLUMBIA.

AEROPLANE.

1,266,151.     Specification of Letters Patent.     Patented May 14, 1918.

Application filed July 11, 1910. Serial No. 571,420.

*To all whom it may concern:*

Be it known that I, NICOLAS POGOLSKI, a subject of Emperor of Russia, residing at Washington, in the District of Columbia, have invented certain new and useful Improvements in Aeroplanes, of which the following is a specification.

The object of this invention is to construct an aeroplane possessing the following characteristic properties.

First; an inherent stability, affording safety to aviation equal to that existing in other means of locomotion of general use. In existing aeroplanes there are but two elements of inherent stability, namely, the momentum and the moment of inertia of the rotating parts, and while various devices have been devised designed to provide automatic equilibration, experience shows that these devices are inadequate in their action and in their use the skill of the aviator still remains the supreme factor and guarantee of safety. Therefore the present invention aims to increase the inherent stability and produce safety in flying by eliminating the human factor as far as possible, and increasing the inherent stability by a special provision of a plane so arranged as to hold with great force the aeroplane in its line of flight.

Second; a provision for maintaining the flying aeroplane in a horizontal direction, whereby through proper steering, the line of flight will coincide with the horizontal direction and thereby increase the horizontal velocity.

Third; to provide means for increasing the power of ascension and sustension at the expense of the horizontal velocity, and Fourth; to provide means for automatically preserving and, eventually for restoring, the transverse equilibrium of the aeroplane, that will act with graduated power sufficient for the purpose of meeting the requirement of every unbalancing of the plane, such as occurs from sudden gusts of wind or the persisting air current, thereby eliminating the unreliable factor of manual control for the maintenance of transverse equilibrium.

To the above ends the invention consists in the novel construction and arrangement of parts, all as hereinafter described and specifically set forth in the appended claims.

In the accompanying drawings,

Fig. 13ᵃ is a view in elevation of the plane shown in Fig. 13, together with the connections of the half planes and means for operating same;

Figure 1:
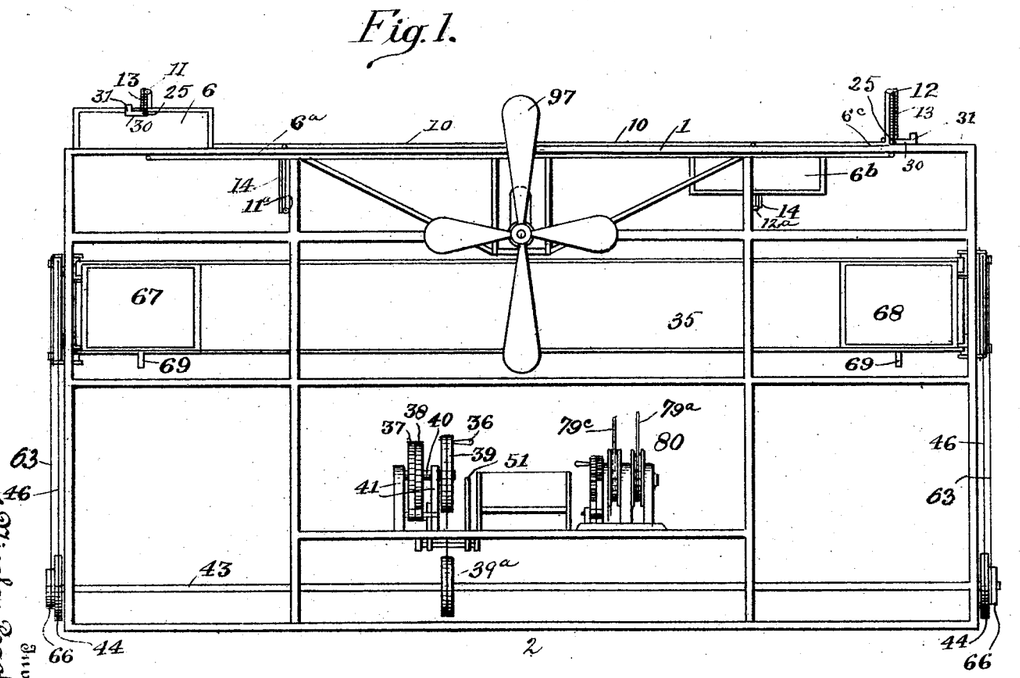
Figure 1 represents a front elevation of an aeroplane constructed in accordance with the invention.
Figures 2, 10, 15:
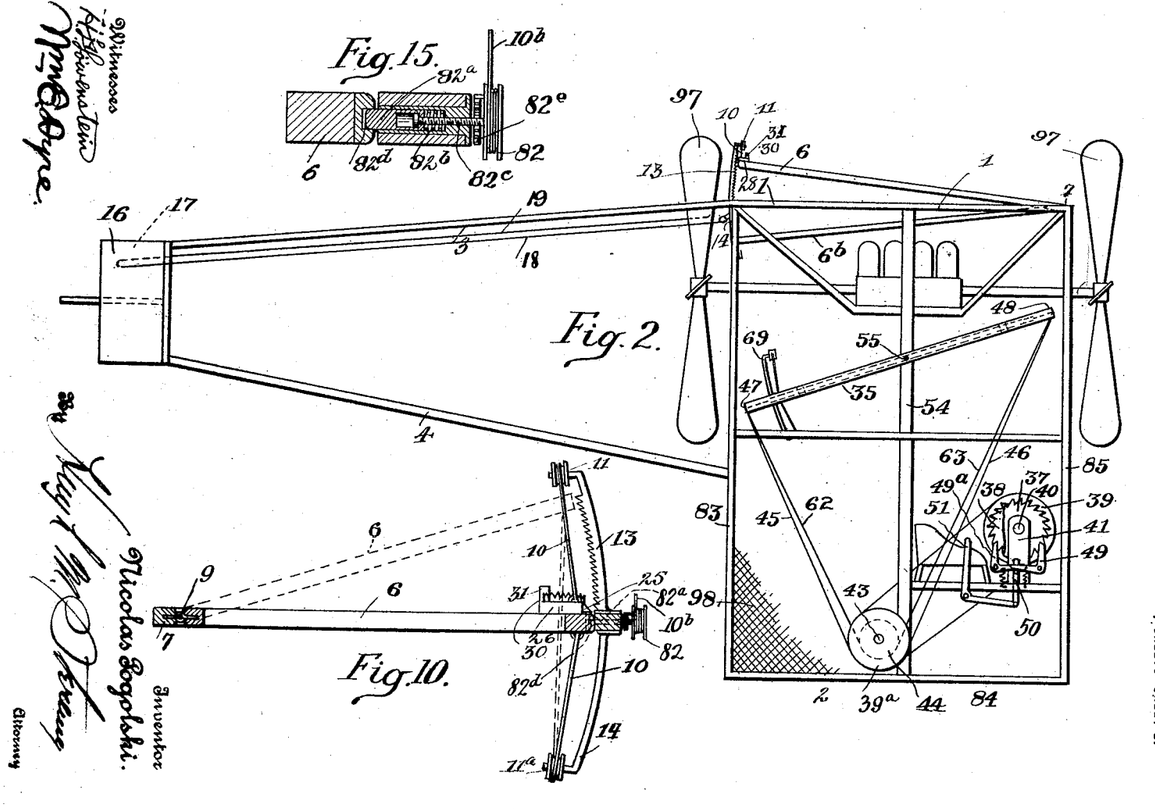
Fig. 2 is a side view of the same.
Fig. 10 is a detail view showing the double stanchion employed for vanes or opening portions, opening to both sides of the plane.
Fig. 15 is a detail showing a stop for holding a pivoted half plane in the plane of its supporting frame.
Figure 3:
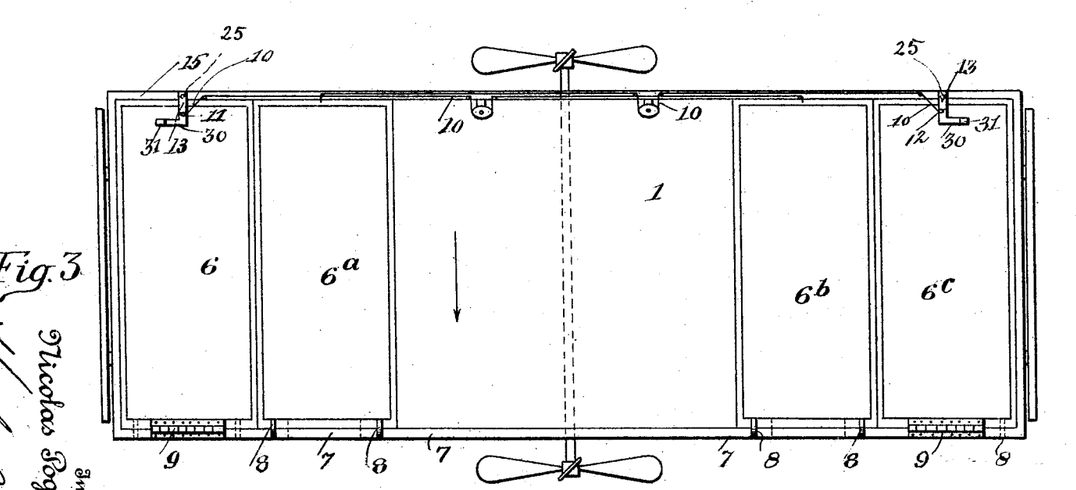
Fig. 3 is a plan or top view of the aeroplane.

Referring more particularly to the drawings, Figs. 1, 2 and 3 illustrate the preferred form of the aeroplane.

To impart to the aeroplane the new element of inherent stability referred to in the above first-mentioned object, I take for my model not the flight of ths birds, but that of arrows, because although the momentum of the latter is quite insignificant, nevertheless it shows in flight a great stability. The arrow moves with the ambient air and is deviated from its path by air currents, and but for the absence of a rudder it would always hit the mark. It owes its stability of flight to the two relative air currents sliding along its feathered tail, as these two currents hold the arrow clenched or clamped between them and prevent deviation from its course. The same principle is employed in the present invention to insure the stability of the aeroplane. The projected aeroplane being preferably a biplane I use its upper plane 1 to form what I am pleased to call a stabilizer, by fixing it in a plane parallel, or very nearly so, to the axis of the propeller, thereby eliminating any angle of attack and obtaining two air currents along the surface of this plane, which currents being of equal force will have a clenching or clamping effect thereon will hold and direct it arrow-wise, thereby giving to it a great fixity of position. Owing to the great superficies of the plane the above clamping effect and the resultant stability is considerable. This stabilizer 1 is given the form of a flat plane (see Fig. 1) but may be varied as to form, as experience may determine other forms to be more suitable.

By reference to Fig. 2 it will be seen that the preferred form of the aeroplane comprises a skeleton-like frame of rectangular form in which the stabilizer and lifting plane are mounted and extending from this framework and rigidly secured thereto is a tail outrigger frame consisting of the reach bars 3 and 4.

The stabilizing plane 1 (hereinafter referred to as stabilizer) is preferably located at the top of the rectangular main frame 2 and may constitute a part of said frame.

Figure 4:
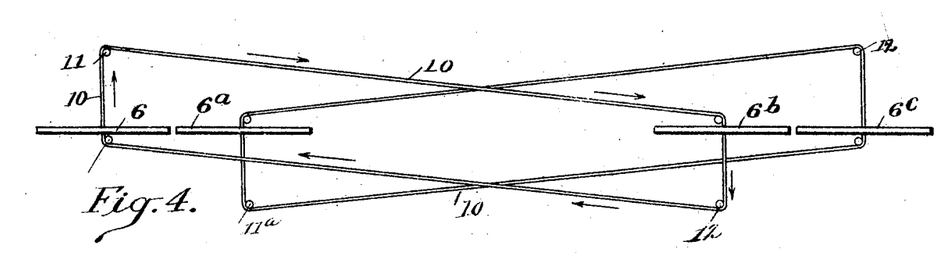
Fig. 4 is a diagram showing the connections of opening portions or vanes.

For the purpose of preventing the disturbance of transverse equilibrium the stabilizer is provided in each of its wings or half sections with a pair of vanes, 6, $6^a$, $6^b$, $6^c$ (Fig. 3) which vanes are located near the outer extremities of the stabilizer and are hinged on the foreframe 7 thereof and are kept in their position by the springs 8. Under the pressure of wind striking one of the aeroplane wings, one of the latter's vanes opens either upward or downward, according to the direction of the wind, leaving thus a free passage for the wind. The two extreme vanes 6 and $6^c$ open upward while the other two $6^a$ and $6^b$ open downward upon their respective hinges 9. The vane 6 is connected through the cord 10 with the vane $6^b$ on the opposite side, in such a way that whenever one of them opens the other must also open but in contrary direction. This connection is shown in Figs. 3 and 4. With the raising of the vane 6, the vane $6^b$ is pulled downward by the cord 10 which is fixed to both vanes and passes over pulleys 11, $11^a$ and 12, $12^a$ (Fig. 1) supported, respectively, on the upper stanchion 13 and the depending stanchion 14 coöperating with the vane $6^b$ and carried by the rear frame 15 (Fig. 3).

In the same manner as the above the vane $6^a$ is connected with vane $6^c$. Each pair of vanes is connected with one of the vertical rudders 16 and 17 (Fig. 2) the rudder 17 being indicated by a dotted line as being hidden by the rudder 16 with which it is identical, thus the vanes 6 and $6^b$ are connected with the left rudder and the other pair $6^a$ and $6^c$ with the right rudder, the details of which connection are shown in Fig. 7, which represents a sectioned plane showing the connection between sections thereof on the same principle as above.

Figure 6:
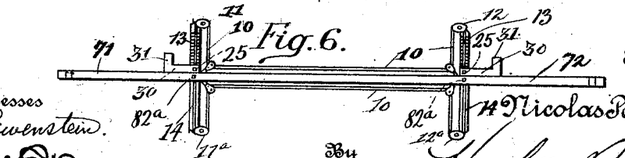
Fig. 6 is a front view showing the connections of two stabilizing pivoted half planes.
Figures 7, 8, 9, 12:
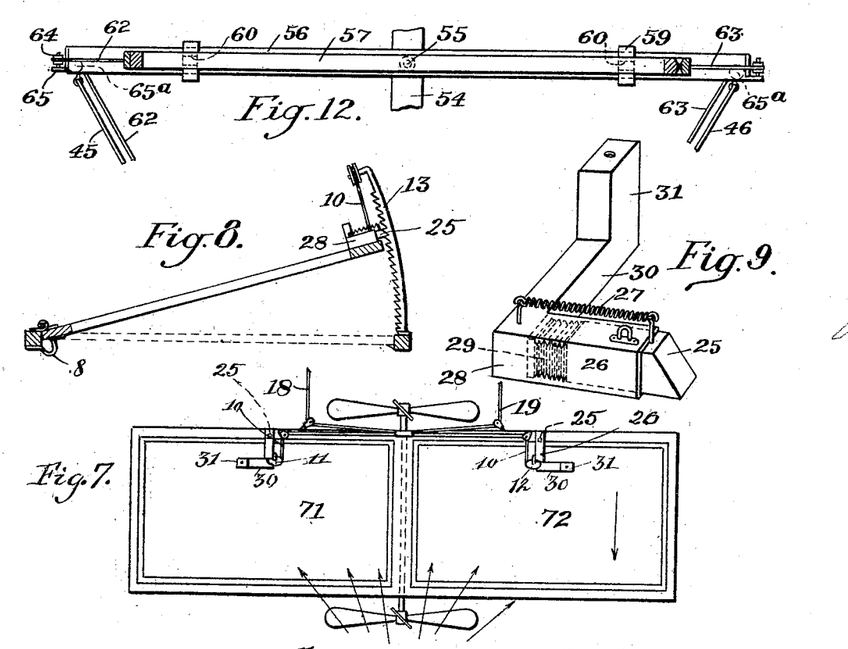
Fig. 7 is a plan view showing the connection between the two stabilizing pivoted half planes and their connection with the rudders.
Fig. 8 is a detail view showing the stanchion of the opening portion or vanes opening to one side, and disclosing a side view of a mercury lock for said opening portion.
Fig. 9 is a perspective view of the said mercury lock.
Fig. 12 is a detail view showing a side elevation of the pivoted plane support with the plane thereon shown in section.
Figure 17:
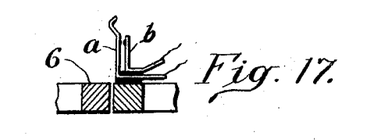
Fig. 17 is a detail showing a suitable provision for a signal bell to give warning of the opening of the vanes of the plane to a predetermined degree.
Figure 18:
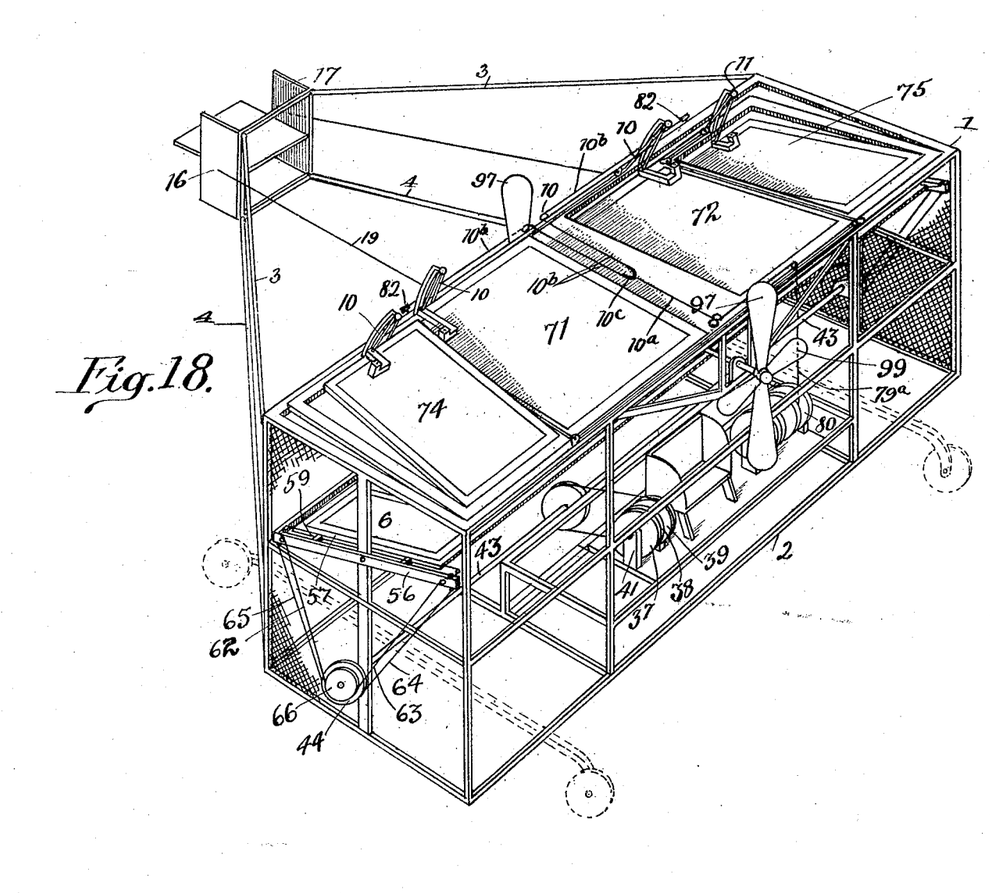
Fig. 18 is a perspective view showing the complete aeroplane.

In the modified form as shown in Figs. 6 and 7 the vanes or half sections are indicated by numerals 71 and 72, but the operation of these vanes upon each other and upon the rudders is similar to that shown in the other figures with the exception that each vane is capable of opening upward and downward but in opposite direction one to the other, thus when the vane 71 under air pressure opens upwardly and the vane 72 downwardly as the result thereof, the part of the cord 10 lying above the frame moves from left to right. When the vanes are closed, the ropes 18 and 19 attached to the cord 10 are slack, but by the opening of the vanes to a certain predetermined degree and the consequent movement of the cord 10, the ropes 18 and 19 become strained by being pulled and give a pull to the rudder with which they are connected. The aviator can be informed of the opening of the vanes to a certain degree, such, for instance, as would be sufficient to cause the operation of the rudder automatically and thus be warned of possible danger. Preferably, for giving a warning of possible danger the extreme vanes 6 and $6^c$ (Fig. 3) are provided each with an electrical bell, set in action at the moment when the opening of the vane has reached a certain predetermined degree. Any well known arrangement can be made for this purpose, but in the present instance a preferred construction is represented in Fig. 17 in which two contact terminals a and b are brought together by the contact with the terminals a of the vane 6 in opening. By this means the aviator will have two bells, (not shown) one on each side, to indicate on which side the disturbing pressure is occurring.

The utility of the opening of two vanes consists in the reduction of the pernicious effect of differential pressure of wind on the two wings and thus constitutes a means for preventing the disturbance of equilibrium. In case, the action of the stabilizer, and the effect of the opening of vanes would not answer the purpose, the aeroplane being brought to a position inclined to the horizontal, and when after the subsiding of the wind the vanes would be shut by the clenching currents and the springs, then some means would be required to bring the aeroplane back into a horizontal position. For this purpose I so arrange the vanes that they are not shut up with the subsiding of the wind but remain open until the equilibrium is restored. The device for accomplishing this result is represented in Figs. 8 and 9, and will now be referred to.

The stanchions with which the vanes are provided are of curved form (Fig. 8) of the radius of the vane length. The concave surfaces of the stanchions 12 and 13 (Figs. 1 and 3) of the extreme vanes are toothed. The rear transverse frame of the vane carries a mercury lock (Fig. 9), and whenever it is actuated, as hereinafter set forth, its locking bolt 25 enters between the teeth of the stanchion thereby preventing the closing of the vane while leaving it free to open further upon any increase of wind pressure. In Fig. 8 is shown a side view of the lock, while Fig. 9 represents the latter in perspective. The locking bolt 25 moves in the jacket 26, and when the vane is not being locked the said bolt is kept in its normal position by the spring 27. The space 28 between the bottom of the jacket and the rear of the lock is occupied by a folding bag 29 of bellows construction, which bag is filled with mercury. Referring to Fig. 9, it will be seen that the jacket is connected with a mercury tube 30 formed at right angles to it, the tube being provided with an elbow 31 standing upright or perpendicularly to the plane of the stabilizer. When the bag 29, tube 30 and, partially, the elbow 31, are filled with mercury the pressure of the latter on the bolting lock is counterbalanced by the spring 27, the tube 30 being affixed on the side nearest to the lateral edge of the plane, consequently, when the said edge is raised the pressure of mercury on the locking bolt is increased and the bolt is pressed out of the jacket. In this way the vane is locked through the effect of the mercury's weight under the influence of gravity and remains locked so long as the plane remains inclined to the horizontal position. As soon as the plane comes to the horizontal the pressure of mercury on the locking bolt substantially disappears and the vane being unlocked comes to its normal position. The tube 30 must be affixed on that side of the vane which is nearest to the lateral edge of the aeroplane. It is sufficient to have such lock arranged only for the extreme vanes 6 and 6ᶜ because of the connection existing between each pair of vanes lying on the opposite wing of the aeroplane and opening simultaneously but to different sides.

Referring now to the lower or lifting plane 35 it will be seen that it is pivoted on an axis perpendicularly to that of the propeller and consequently the angle of attack can be varied at will, and that it is so mounted that the center of air pressure on it will remain in a constant position relatively to other structural parts of the aeroplane by virtue of an edgewise shifting of the plane backward and forward. For the fulfilment of the above purposes two sets of different devices are combined. The pivoting of the plane is accomplished with the aid of the arrangement represented in Figs. 1, 2, 11 and 12, and which consists of a handle 36 (Fig. 1), two ratchet wheels 37 and 38, and the pulley 39 set on the axle 40. 41 are the supports for the bearings of the axle 40. The pulley 39 is connected with the pulley 39ª, set on the axle 43, which carries on each of its ends a drum 44. On each of the said drums are wound two ropes 45 and 46 each in contrary direction to the other, so that by turning the drum one of the ropes is wound while the other is unwound. The drums at the point where the ropes are wound is given such form in cross section that the ropes 45 and 46 which are attached to the corners 47 and 48 (Fig. 2) of the pivoted plane 35 remain always equally strained. The practical working out of the drum surfaces for this end can readily be determined and presents no difficulties.

Each change in the position of the plane 35 must be preceded by freeing the ratchet wheels 37 and 38 from their pawls 49 and 49ª, (Fig. 2) and this is accomplished with the aid of a pawl operating member 50 that is designed to be pushed between the pawls by the hand lever 51 connected with said member. It is obvious that the power for operating the plane 35 to change its position can be obtained from the motor if desired.

Figure 11:
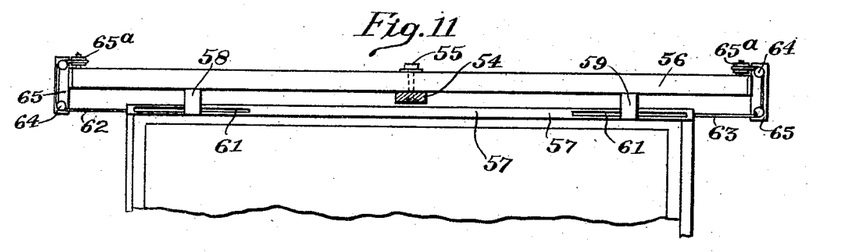
Fig. 11 is a detail showing a top view of a portion of the lower plane and the pivoted side support therefor.

As shown in Fig 2, the lower plane 35 is pivoted to the side frame 54 on the axis 55. Inasmuch as with the tilting of the plane the angle of attack changes its value and the center of air pressure its position, so to insure the stability of the position of the center of air pressure a special provision is imperatively required that will make the position of the center of air pressure independent of the angle of attack. For this purpose the exact rate of the recession of air pressure from the foreframe with the increase of the angle of attack must be determined, and the curve representing the relation between the two above values must be constructed. The position of the center of air pressure on a pivoting plane is readily determined, for whenever the above center of pressure falls in with the axis of the pivot then all the ropes belonging to the pivoting arrangement are equally strained. Now, if by increasing the angle of attack we simultaneously shift the plane forward a distance equal to that in which the center of air pressure has receded, as would be indicated in the above said curve, then the center of pressure would remain always on the fixed axis of the pivots, although it would be distributed along the plane's surface. Therefore to have the center of pressure relatively stationary with respect to the supporting structure, an arrangement is necessary for the automatic shifting of the plane at the above said determined rate. In Figs. 11 and 12, is represented the arrangement in question. The vertical face of the framing 54 carries the axis or pivot 55 on which is set a pivoting beam 56. 57 is the lateral frame of the pivoted plane, and 58 and 59 are two arms fixed to the beam 56, in which arms the framing 57 of the plane is slidably held (Fig 11), the arms being forked to receive the frame 57, and having each a projection 60 which extends into a groove 61 in the frame to retain the same therein.

The frame 57 can slide to the left or to the right according to the direction of pull given by the ropes 62 and 63, which ropes are attached to the ends of the sliding frame 57 and pass over the two pulleys 64, mounted on a plate 65 (Fig. 11), and then pass around a roller 65a and are led to the drum 66. This drum, (see Fig. 1) on which these ropes are wound in contrary direction, each to the other, controls the shifting of the plane edgewise, forward and backward, thus when the drum is being turned, one of the ropes is wound on it while the other is unwound. The drum 66 is set on the same axis and close to the drum 44 which carries the tilting ropes 45 and 46. It is obvious that in the above manner the position of the center of air pressure can be made independent from the angle of attack. The surface of the drum 66 is worked out in the same practical way as that of the drum 44 in order to compensate for any slack and to keep the ropes taut. The foregoing arrangement is made on each side of the aeroplane so that one pair of said drums 66 and 44, is set on each end of the axis.

One of the important advantages of the above arrangement for varying the angle of attack during flight will be the possibilty to remain flying in one and the same horizontal plane, and not to be constantly flying up and down as is now generally required and practised.

The lower or lifting plane is preferably provided with two vanes 67 and 68, one at each extremity of the wings (Fig 1). These vanes are each adapted to open above and below the plane and are connected in the same way as the above described vanes of the rigid stabilizer, but are not connected with rudders and have neither bell nor mercury locks so that their stanchions 69 are smooth. In practice a strong gust of wind striking say the vane 67 will push it upward, whereby the angle of attack on it will be decreased while at the same time the vane 68 will be drawn downward and its angle of attack will be decreased. This displacement of vanes will go on until the pressure on the two vanes will be equalized. In case of a wind blowing with equal force on both vanes, the plane will remain closed, and will behave as an unbroken, perfectly rigid one.

Figure 5:
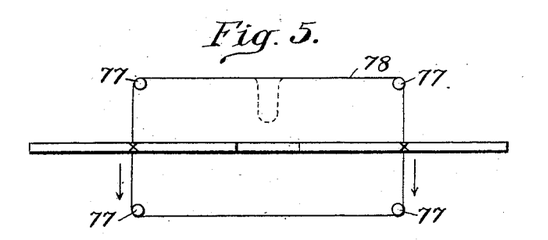
Fig. 5 is a diagram showing the connections of the opening portions or vanes when opening to both sides of the plane.
Figure 13:
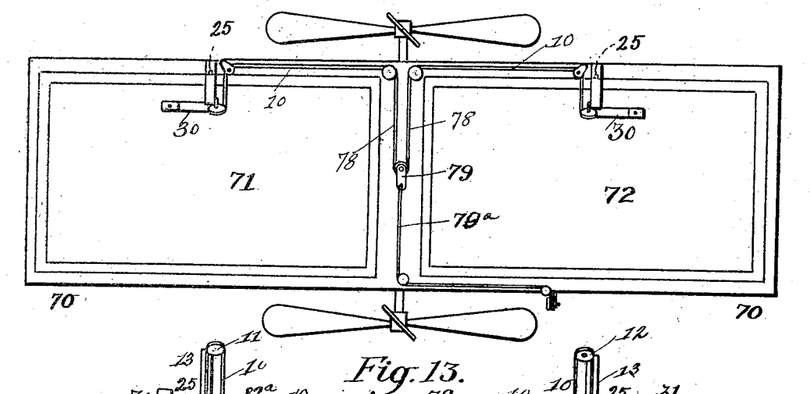
Fig. 13 is a top view of a stabilizing plane formed of two half opening sections and provided with connections to permit the tilting of the same.
Figure 13A:
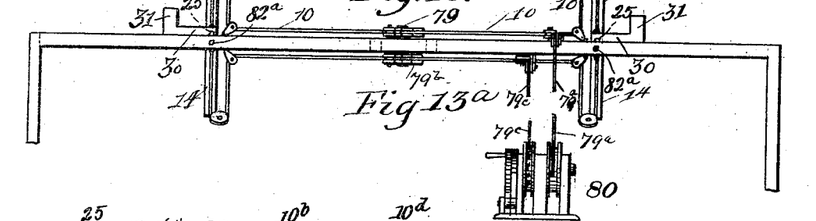

In Fig. 13, there is shown a modification in the rigid stabilizer with automatically balancing sections, and in this form of the stabilizer, instead of the two oppositely opening vanes in each wing, a single vane of increased area is used for each wing, and each vane is adapted to open both upward and downward. The means for automatically controlling these large vanes is substantially the same as heretofore described in connection with the small vanes, with the exception that in this modification each vane is provided with two stanchions 13 and 14 (Fig. 10), the upper one 13, being toothed. The flexible connection between the vanes is shown diagrammatically in Fig. 5, and the details of their construction are shown in Figs. 13 and 13ª. This form of the stabilizer is a preferred construction when it is found desirable to give to a normally rigid stabilizer a variable and adjustable rigidity, so that by the manual adjustment of the two vanes they may readily be brought out of their normal, fixed position of parallelism to the axis of the propeller and maintained in a position giving them an angle of attack when it is desired to so employ them, as in rising and descending and in various emergencies. To this end the frame 70, which corresponds to the frame of the rigid stabilizer is provided with the two half-planes 71 and 72, which are hinged therein so as to open both upward and downward through the geometric plane of the frame 70. The two half-planes are separated only by a central cross-frame of such width as is necessary to insure the strength and rigidity of the plane as a whole. These two half-planes 71 and 72 are connected in the same manner as are the vanes 6 and $6^a$, and it will be seen from the diagram of Fig. 5, representing the mode of connection of the two-way swinging vanes, that the cord 10, being fastened to both vanes and the pulleys 77, (representing pulleys 11 and $11^a$) fixed in their position, the simultaneous raising or simultaneous lowering of the vanes is impossible unless one of the two half-circuits of the cord 78 (representing cord 10) be somehow lengthened, and in this case the other half of the cord would become slack and would require straining. This lengthening of one and the straining of the other part is effected through the displacement of the block 79 (Fig. 13) which is slidably mounted in the frame and carries the cord or flexible connection $79^a$. Simultaneously with the shifting of said block another block $79^b$ (Fig. $13^a$), arranged in the same manner on the under surface of the frame and carrying the cord of the lower half circuit, is being displaced in a contrary direction. The pull then given to the lower cord $79^c$ causes the downward opening of both half planes. This reciprocal contrary movement of the two blocks 79 and $79^b$ is effected manually through the turning of the pulley 80 to which are attached and wound thereon in contrary direction two cords $79^a$ and $79^c$ connected each to its said block. The pulley 80 may be operated by the crank shown or by a lever or other suitable device.

The two half planes 71 and 72 are each provided with an upper and a lower stanchion, the upper stanchion being toothed. They are each provided with a mercury lock and a signal bell and are connected each with the corresponding rudder. The connecting cords from these half planes to the rudders being normally loose, the said connections are only operatively established when the half planes have been opened to a predetermined degree. These half planes differ from the main vanes of the rigid stabilizer in that the half planes are provided each with a stop (Figs. 10 and 15) for imparting to them any desirable amount of rigidity, and is a common form of stop, the action of which ceases at the moment when the limit of usefulness is reached in producing rigidity or locking of the plane and when the stability of the aeroplane would require the setting in action of the swinging half planes of the stabilizer.

Figure 14:
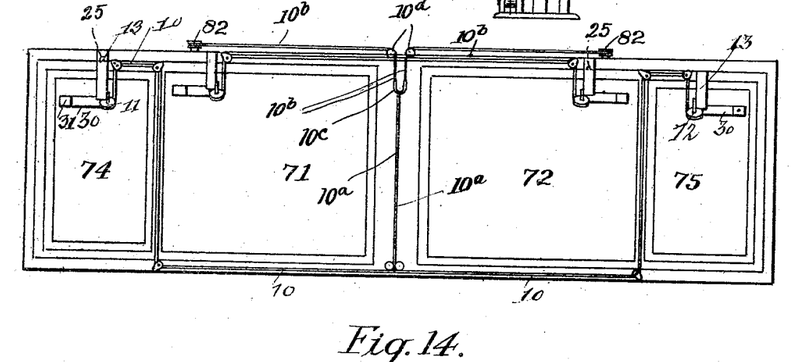
Fig. 14 is a top view of a stabilizing plane in which each half section is provided with two opening sections, and the means for connecting the same.
Figure 16:
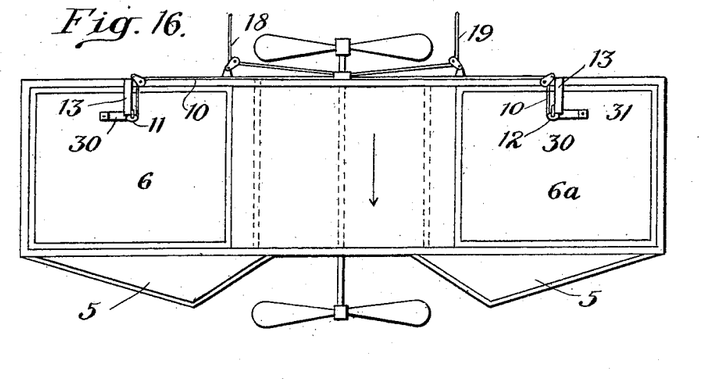
Fig. 16 is a plan view of a rigid stabilizing plane having two large opening portions or vanes and showing their connections.

In Fig. 14 the application of the stop to the half planes is shown in a modified construction in which two sub-vanes 74 and 75 that open to both sides, are employed for automatically controlling the stops $82^a$ shown in operation upon the half planes 71 and 72 of said modification, by the cord 10 to which is also attached the cord $10^a$ which operates the two branches or cords $10^b$ connected to the block $10^c$ and passing each over its respective pulley $10^d$ to the stop-controlling pulley 82, the said pulley being mounted on the main frame and not on the frame of the half planes.

The stop as shown, comprises in addition to the pulley 82 for operating same, a sliding bolt $82^a$ which is extended by the action of a coiled spring $82^b$. The bolt is retracted by the action of the screw threaded pulley spindle $82^c$, which, as the pulley rotates in unwinding the cord $10^b$, moves backward with respect to the bolt and compresses the spring. The end of the spindle has a sliding connection to the bolt so that a certain degree of movement will be provided before the bolt is operated. When the action of the sub vanes is such as to cause slack in the cords $10^b$, as in closing, the pulley and its spindle are reversely rotated by the spiral spring $82^e$, which action screws the spindle forward and brings the bolt into position for automatically engaging the recess $82^d$ in the half plane.

The moment when it will be required to set into action the swinging half planes will be determined by a certain definite degree of opening of the small vanes 74 and 75, and such degree of opening will be determined by the amount of slack in cord $10^b$ and the length of the portion of the cord wound upon the stop operating pulley, which cord through the taking up of slack and unwinding causes the screw spindle at the proper point in its movement to pull out the bolt $82^a$, thus leaving the half plane free to swing.

Therefore it will be seen that by the above modification there will be gradation in means of automatic transverse equilibration, and in case one of the wings is struck by a strong wind, the clenching currents of the whole stabilizer will oppose any displacement of the plane, and then the vanes, owing to their lightness, will be opened and will contribute to the maintaining of equilibrium, and next, when the opening of the vanes has reached a critical point the swinging half planes of the stabilizer will come into action, and finally when the opening of the said half planes has reached a certain degree the rudder is brought into action automatically with stabilizing effect.

Having thus fully described my invention what I claim and desire to secure by Letters Patent, is:

1. In an aeroplane, the combination with a supporting structure, a propeller, and a lifting plane adapted to vary its angle of attack with respect to said supporting structure, of a stabilizing plane normally fixed in parallelism with the axis of the propeller and in superposed relation to said lifting plane, means under the control of the operator for changing the angle of the lifting plane with respect to the supporting structure, means for causing said stabilizing plane to assume a position at an angle to the axis of the propeller when desired, and means for shifting the lifting plane in the supporting structure to maintain the center of gravity and of air pressure in a constant position in the supporting structure and render the position of air pressure independent of the angle of attack.

2. In an aeroplane, the combination with a supporting structure, a propeller, and a lifting plane adapted to vary its angle of attack, of a stabilizing plane parallel to the axis of the propeller, the said lifting and stabilizing planes being arranged in superposed relation, the latter directly above the former, means under the control of the operator for changing the angle of attack of said lifting plane during flight, and means for changing the position of the lifting plane without disturbing the relative positions of the center of gravity of the aeroplane and the center of air pressure, whereby the position of the center of air pressure is rendered independent from the angle of attack.

3. In an aeroplane, the combination with a supporting structure, a propeller, and a lifting plane adapted to vary its angle of attack, of a stabilizing plane parallel to the axis of the propeller, said lifting and stabilizing planes being arranged in superposed relation, the latter directly above the other, and means for moving said lifting plane edgewise in the planes of attack whereby to maintain the position of the center of air pressure constant with relation to the position of the center of gravity of the aeroplane.

4. In an aeroplane, the combination with a supporting structure, of a propeller, a lifting plane adapted to be tilted with reference to the supporting structure and shifted edgewise back and forth in the geometrical planes into which said lifting plane may be brought through its tilting, and means under the control of the operator for simultaneously shifting and tilting of said lifting plane during flight, whereby to maintain the center of air pressure in a constant position on the axis of pivoting of the said plane and consequently in constant relation to the center of gravity of the aeroplane.

5. In an aeroplane, the combination with a supporting structure, a propeller, and a lifting plane adapted to be adjusted to different angles of attack during flight, of a stabilizing plane adapted to vary its position in the said supporting structure and also to be held fixed in parallel relation to the axis of the propeller when an angle of incidence to the air currents is not desired, said lifting and stabilizing planes being arranged in superposed relation, the latter directly above the former, and means connected to each plane for operating and controlling the same.

6. In an aeroplane, the combination with a supporting structure, of a lifting plane carried thereby, means for changing the angle of attack of said lifting plane during flight and with reference to the supporting structure, and means for moving said lifting plane back and forth edgewise in any of the planes to which said plane may be adjusted.

7. In an aeroplane, the combination with a supporting structure, of a lifting plane, supports tiltably mounted in said supporting structure and slidably holding said lifting plane for edgewise movement thereon, means for shifting said plane back and forth along said supports, and means for controlling the tilting movement of the supports.

8. In an aeroplane having its center of gravity maintained practically in a fixed position therein, of a lifting plane adapted to be tilted and shifted edgewise back and forth in the geometrical plane into which said tilting plane is brought through its tilting movement, and means under the control of the operator for shifting said lifting plane, whereby to maintain the center of air pressure in a constant position on the axis of pivoting, as and for the purpose set forth.

9. In an aeroplane, a lifting plane pivoted on an axis lying transversely to that of the propeller, and adapted to be shifted edgewise back and forth in the geometrical plane into which the said lifting plane is brought through its pivoting, said aeroplane having its center of gravity in a fixed position relative to the structural part of the same and to the position of the center of air pressure on said lifting plane, means for adjusting the angle of attack of said lifting plane during flight and for simultaneously shifting the same through one and the same operation, as and for the purpose set forth.

10. In an aeroplane, the combination with a lifting plane of a support therefor tiltably mounted in the main structure of the aeroplane, said plane being slidably held in its said support for edgewise movement thereon, cords connected with the ends of said plane support, cords connected with the plane for operating the shifting of the same back and forth, and means for bringing in action the said cords for simultaneously tilting and shifting the said plane, as and for the purpose set forth.

11. In an aeroplane, the combination with a lifting plane, of a support therefor tiltably mounted in the main supporting structure, said plane being slidably held in its said support for edgewise movement thereon, cords connecting with the ends of said plane support, cords connected with the plane for operating the same back and forth, and one or more operating drums for simultaneously controlling the tilting of the said plane support and the shifting of the plane thereon, as and for the purpose set forth.

12. In an aeroplane, the combination with a lifting plane of a support therefor tiltably mounted in the main supporting structure of the aeroplane, said lifting plane being slidably held in its said support for edgewise movement thereon, cords connecting with the ends of said plane support, cords connected with the plane for operating the same back and forth, said plane operating cords passing over guides at opposite ends of said support, and means for operating said tilting and shifting cords for the control of said plane, as and for the purpose set forth.

13. In an aeroplane, having a graduated means of transverse equilibration, said means consisting of a plane having each wing thereof provided with a balancing section adapted to open upward or downward, means connecting the balancing sections of two wings, whereby the opening movement of one will open the other in the opposite direction, a subsection or vane provided in each of said balancing sections, means for connecting said subsection for opposite opening movement, and means for holding the said balancing sections fixed in the frame of the plane until the subsections have opened to a predetermined degree, whereby to secure graduation in the opening of the sections by the successive operation of the balancing sections through their subsection, as and for the purpose set forth.

14. In an aeroplane, a plane having each wing thereof provided with a balancing section adapted to open upward or downward, means connecting the balancing sections of the wings whereby the opening movement of one will open the other in the opposite direction, a subsection or vane provided in each of said balancing sections, said sub-vanes being connected for opposite movement independent of the movement of said balancing sections, and means for causing each balancing section and its subsection to have successive opening movement, whereby to provide for graduated relief of air pressure, as and for the purpose set forth.

15. In an aeroplane, a plane having each wing thereof provided with a balancing section adapted to open upward or downward, means connecting the balancing sections of the wings whereby the opening movement of one will open the other in the opposite direction, and means for locking said balancing sections against opening, said locking means being adapted to yield at a predetermined degree of air pressure whereby to unlock the balancing sections, as and for the purpose set forth.

16. In an aeroplane, a plane having each wing thereof provided with a balancing section adapted to open upward or downward, means connecting the balancing sections of the wings whereby the opening movement of one will open the other in the opposite direction, a subsection or vane provided in each of said balancing sections, arranged and connected like the latter, means for holding said balancing sections against opening until the subsections have been opened to a predetermined degree, said means being controlled by said subsections, as and for the purpose set forth.

17. In an aeroplane, a plane having each wing thereof provided with a balancing section adapted to open upward or downward, means connecting the balancing sections of the wings whereby the opening movement of one will open the other in the opposite direction, and means for locking said balancing sections against opening, a subsection or vane provided in each of said balancing sections, arranged and connected like the latter, and adapted to unlock said balancing sections upon reaching a predetermined degree of opening, two vertical rudders, and means connecting the same with the balancing sections whereby to cause the actuation of the rudders by the opening movement of said balancing sections after said sections have reached a predetermined degree of opening.

18. In an aeroplane, the combination with one or more lifting planes adapted to vary their angle of attack with reference to their supporting structure, of one or more stabilizing planes adapted to have a fixed position in the supporting structure and present no angle of attack, said stabilizing planes having a pair of sections or vanes connected to open in opposite directions, one being actuated by the other in yielding to the force of air pressure thereon unequally brought upon the entire plane, and each presenting when open a resistance to the air to cause the restoration of equilibrium.

19. In an aeroplane, the combination with one or more lifting planes adapted to be adjusted during flight to different inclinations relative to the supporting structure thereof, of one or more stabilizing planes fixed in said supporting structure having sections or vanes in each wing thereof adapted to open under unequal air pressure, means connecting a section or vane of one wing with a section or vane of the other wing, whereby as one opens in one direction the other will open in the opposite direction, as and for the purpose set forth.

20. In an aeroplane, the combination with one or more planes having sections or vanes adapted to open under unequal air pressure on the two wings, of a standard carried by the frame of the plane, a locking means for engaging said standard at different elevations thereon, carried by said sections or vanes, and comprising a bolt, means for retracting the same and holding it normally retracted, a tube for containing a column of mercury or other suitable liquid, arranged transversely on said sections or vanes and adapted to cause the weight of said column to act upon the bolt, whereby as the said plane or planes tilt, the weight of the said column will advance the bolt against its retracting means, and allow the retraction of the bolt by the shifting of the weight of said column when the plane or planes reach the horizontal position, as and for the purpose set forth.

21. In an aeroplane, one or more planes having each half portion or wing thereof provided with a section or vane adapted to open in either direction, means connecting the same whereby the opening movement of one will open the other in the opposite direction, means for locking said sections or vanes in different positions of opening, and means for unlocking the same, as and for the purpose set forth.

22. In an aeroplane, one or more planes having each half portion or wing thereof provided with a section or vane adapted to open, means for connecting a section or vane of one half portion or wing with the section or vane of the other whereby they are caused to open in opposite directions, a rudder, and a connection between said sections or vanes and said rudder whereby the rudder will be operated upon a predetermined opening of said sections or vanes, as and for the purpose set forth.

23. In an aeroplane, one or more planes having sections or vanes adapted to open under unequal air pressure on the two wings, and carrying a locking means actuated by the tilting of the said plane or planes, whereby the opened vane will be maintained in open position until the equilibrium is established, as and for the purpose set forth.

24. In an aeroplane, the combination with one or more planes having sections or vanes adapted to open under unequal air pressure on the two wings, of a standard carried by the frame of the plane, a locking means for engaging said standard at different elevations thereon, carried by the said sections or vanes, and comprising a bolt, means for retracting the same and holding it normally retracted, a tube for containing a column of mercury or other liquid, arranged transversely on said sections or vanes, and adapted to cause the weight of the said column to act upon the bolt, whereby as the said plane or planes tilt, the weight of the said column will advance the bolt against its retracting means, and allow the retraction of the bolt by the shifting of said weight when the plane or planes reach the horizontal position, as and for the purpose set forth.

25. In an aeroplane, the combination with one or more planes having sections or vanes, adapted to open under unequal air pressure on the two wings, of a standard carried by the frame of the plane, and a locking means for engaging said standard at different elevations, said locking means being carried by the said sections or vanes and comprising, a bolt, means for retracting the same and holding it normally retracted, a tube containing a column of mercury or other liquid, arranged transversely to the said section or vane, and an expansible receptacle attached to one end of said tube and disposed between the said column therein and the bolt to bear against said bolt, as and for the purpose set forth.

26. In an aeroplane, the combination with one or more planes having sections or vanes adapted to open under unequal air pressure on the two wings, of a standard carried by the frame of the plane, and a locking means for engaging said standard at different elevations, said locking means comprising, a bolt, means for retracting the same and holding it normally retracted, a tube containing a column of mercury or other liquid, arranged transversely to said section or vane, and having at its outer end an upstanding tube or portion, and means interposed between said tube whereby to receive said liquid column and cause it to bear through said means on the bolt, as and for the purpose set forth.

In testimony whereof I affix my signature in presence of two witnesses.

NICOLAS POGOLSKI.

Witnesses:
  HUGH M. STERLING,
  THOMAS DURANT.

Copies of this patent may be obtained for five cents each, by addressing the "Commissioner of Patents, Washington, D. C."